Dec. 15, 1925.
D. A. HEWITT
1,565,448
LUBRICANT RETAINER
Filed June 7, 1921
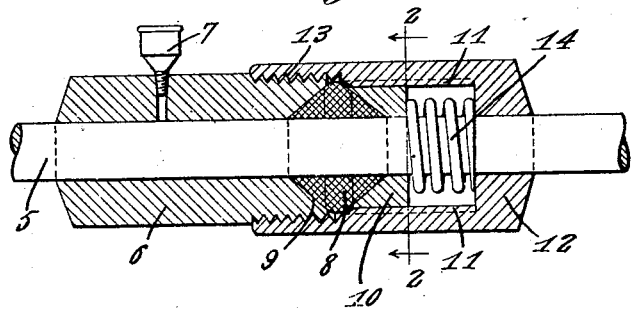
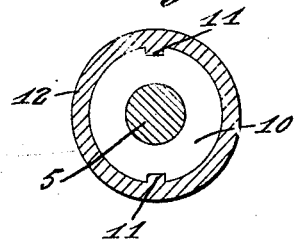
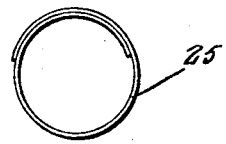
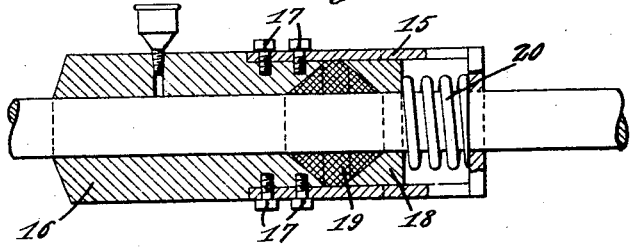
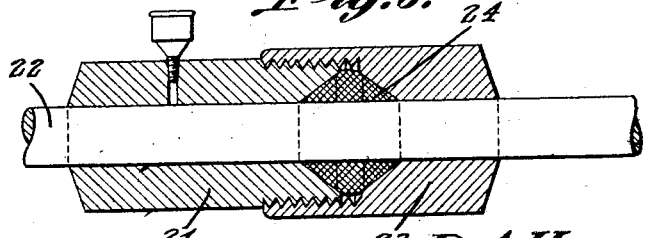
D. A. Hewitt, Inventor
By C. A. Snow & Co.
Attorney Patented Dec. 15, 1925.

1,565,448

UNITED STATES PATENT OFFICE.

DANIEL ALBERT HEWITT, OF THOMASVILLE, NORTH CAROLINA.

LUBRICANT RETAINER.

Application filed June 7, 1921. Serial No. 475,685.

*To all whom it may concern:*

Be it known that I, DANIEL ALBERT HEWITT, a citizen of the United States, residing at Thomasville, in the county of Davidson and State of North Carolina, have invented a new and useful Lubricant Retainer, of which the following is a specification.

This invention relates to machine elements, and more particularly to a novel means employed in connection with a bearing for retaining the oil therein, thereby eliminating any possibility of the bearing running dry, due to a leaking bearing.

An object of the invention is to provide a packing ring to be positioned around the shaft at a point adjacent to the bearing, novel means being also provided to automatically force the packing into close engagement with the shaft associated therewith.

A further object of the invention is to provide means for temporarily securing the packing gland to the shaft, while the permanent securing means is being positioned.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a longitudinal sectional view through a bearing and packing casing constructed in accordance with the present invention.

Figure 2 is a sectional view taken on line 2—2 of Figure 1.

Figure 3 is an elevational view of the temporary securing ring.

Figure 4 is a longitudinal sectional view through the bearing, and a modified form of packing casing; and Figure 5 is a longitudinal sectional view through a bearing and a still further modified form of packing casing.

Referring to the drawing in detail, the reference character 5 designates a shaft, which operates in the bearing 6 and which is supplied with a lubricant through the cup 7. One end of the bearing is provided with a tapered recess to accommodate the packing ring 8 which is provided with tapered walls indicated at 9 to provide a close-fit between the packing and the bearing, or tapered walls of the recess formed therein.

Positioned on the shaft 5 is a follower 10 which is also provided with a tapered recess portion to conform to the taper of the opposite side of the packing, and as shown, this follower is provided with notched portions to accommodate the ribs 11, which are formed within the packing gland nut 12, to prevent rotary movement of the follower 10, and insure a direct pressure on the packing gland 8. This packing gland nut 12 is provided with an opening to accommodate the shaft 5 and is also provided with internal threads 13, which threads cooperate with the threads of the bearing 6, so that the packing gland nut 12 may be secured to the bearing in a manner to prevent longitudinal movement thereof with respect to the bearing and shaft.

Supported on the shaft 5 and disposed within the packing gland nut 12, is a coiled spring 14 which has one end thereof bearing against the inner end wall of the packing gland nut 12, the opposite end thereof, contacting with the follower 10 to exert a pressure thereon and cause the packing 8 to closely engage the shaft 5.

The packing 8 may be formed of any suitable material, the same being split longitudinally to allow for the positioning thereof over the shaft 5. In the form of the invention as illustrated by Figure 4 of the drawings, the packing gland nut indicated at 15 is secured to the bearing 16 as by means of the bolts 17 which have their threaded portions disposed within suitable openings in the bearings 16. In this form of the invention, a follower 18 is employed, which follower is forced into engagement with the packing 19, as by means of the coiled spring 20.

In the form of the invention as disclosed by Figure 5, the bearing 21 which is shown as supporting the shaft 22, is provided with threads to accommodate the internal threads of the packing gland nut 23, the packing indicated at 24 being disposed between one end of the bearing 21 and the packing gland nut 23. In this form of the invention, the packing gland nut 23 is rotated to force the same into close engagement with the packing.

It might be further stated that when the packing is positioned on the shaft, a temporary securing ring 25 is provided, which ring is positioned around the packing, whereupon the packing gland nut may be moved into engagement with the bearing, it being understood that the ring is to be removed just prior to the positioning of the packing gland nut.

From the foregoing it will be seen that an oil-tight connection is provided at all times between one end of a bearing and the shaft operating therein, to the end that waste of oil between the bearing and shaft, is reduced to a minimum.

Having thus described the invention, what is claimed as new is:—

In a device of the character described, a bearing having inclined end walls and having external threads formed adjacent to one end thereof, a packing gland nut having internal ribs and having threads adapted to cooperate with the threads of the bearing to removably secure the packing gland nut to the bearing, a follower having inclined walls and having grooves to receive the ribs, a packing member disposed between the inclined walls of the bearing member and inclined walls of the follower, and a coiled spring positioned between the follower and packing gland nut to force the follower into engagement with the packing member.

In testimony that I claim the foregoing as my own, I have hereto affixed my signature.

DANIEL ALBERT HEWITT.